United States Patent
Tokoro et al.

(10) Patent No.: US 12,216,606 B2
(45) Date of Patent: Feb. 4, 2025

(54) DATA TRANSMISSION SYSTEM, WORK MACHINE, AND DATA TRANSMISSION METHOD FOR WORK MACHINE

(71) Applicant: Komatsu Ltd., Tokyo (JP)

(72) Inventors: Kenji Tokoro, Tokyo (JP); Shinsuke Kiyono, Tokyo (JP); Motohide Sugihara, Tokyo (JP); Yoshimasa Kawakami, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 18/022,305

(22) PCT Filed: Oct. 20, 2021

(86) PCT No.: PCT/JP2021/038732
§ 371 (c)(1),
(2) Date: Feb. 21, 2023

(87) PCT Pub. No.: WO2022/091904
PCT Pub. Date: May 5, 2022

(65) Prior Publication Data
US 2023/0325341 A1    Oct. 12, 2023

(30) Foreign Application Priority Data

Oct. 30, 2020    (JP) .................................. 2020-182482

(51) Int. Cl.
*G06F 13/42*       (2006.01)
(52) U.S. Cl.
CPC .......... *G06F 13/42* (2013.01); *G06F 2213/40* (2013.01)

(58) Field of Classification Search
CPC ............................ G06F 13/42; G06F 2213/40
See application file for complete search history.

(56) References Cited

U.S. PATENT DOCUMENTS

| | | | |
|---|---|---|---|
| 7,689,384 B1 * | 3/2010 | Becker | ................ G06F 11/3452 |
| | | | 702/188 |
| 2005/0081410 A1 | 4/2005 | Furem et al. | |
| 2007/0109604 A1 * | 5/2007 | Marumoto | ............. G06K 15/00 |
| | | | 358/3.13 |
| 2011/0191392 A1 | 8/2011 | Kameda et al. | |

(Continued)

FOREIGN PATENT DOCUMENTS

| | | | |
|---|---|---|---|
| JP | 2002180502 A | * | 6/2002 |
| JP | 2011-176795 A | | 9/2011 |

(Continued)

OTHER PUBLICATIONS

English translation of JP-2002180502-A (Year: 2002).*

*Primary Examiner* — Henry Tsai
*Assistant Examiner* — John B Roche
(74) *Attorney, Agent, or Firm* — Locke Lord LLP

(57) ABSTRACT

Provided is a data transmission system for a work machine, including: a processing definition receiving unit configured to receive processing definition information indicating contents of processing of data collected from the work machine; a processing unit configured to determine a data format to be processed, based on the received processing definition information, and process the data collected from the work machine based on the determined data format; and a transmission unit configured to transmit the processed data to an external device.

12 Claims, 14 Drawing Sheets

(56) References Cited

U.S. PATENT DOCUMENTS

| | | | |
|---|---|---|---|
| 2015/0012339 A1* | 1/2015 | Onischuk | G07C 13/00 235/386 |
| 2015/0293702 A1* | 10/2015 | Fujimori | G07C 5/085 711/154 |
| 2015/0371464 A1 | 12/2015 | Fujimori et al. | |
| 2019/0079727 A1* | 3/2019 | Chen | G06N 3/063 |
| 2019/0173909 A1* | 6/2019 | Mixer | H04L 41/082 |
| 2020/0112609 A1* | 4/2020 | Hardman, III | H04L 45/22 |
| 2021/0310217 A1 | 10/2021 | Akiyama et al. | |
| 2021/0317639 A1 | 10/2021 | Akiyama et al. | |

FOREIGN PATENT DOCUMENTS

| | | |
|---|---|---|
| JP | 2014-177816 A | 9/2014 |
| JP | 2014-178888 A | 9/2014 |
| JP | 2018-138751 A | 9/2018 |
| JP | 2020-056178 A | 4/2020 |
| JP | 2020-056180 A | 4/2020 |

\* cited by examiner

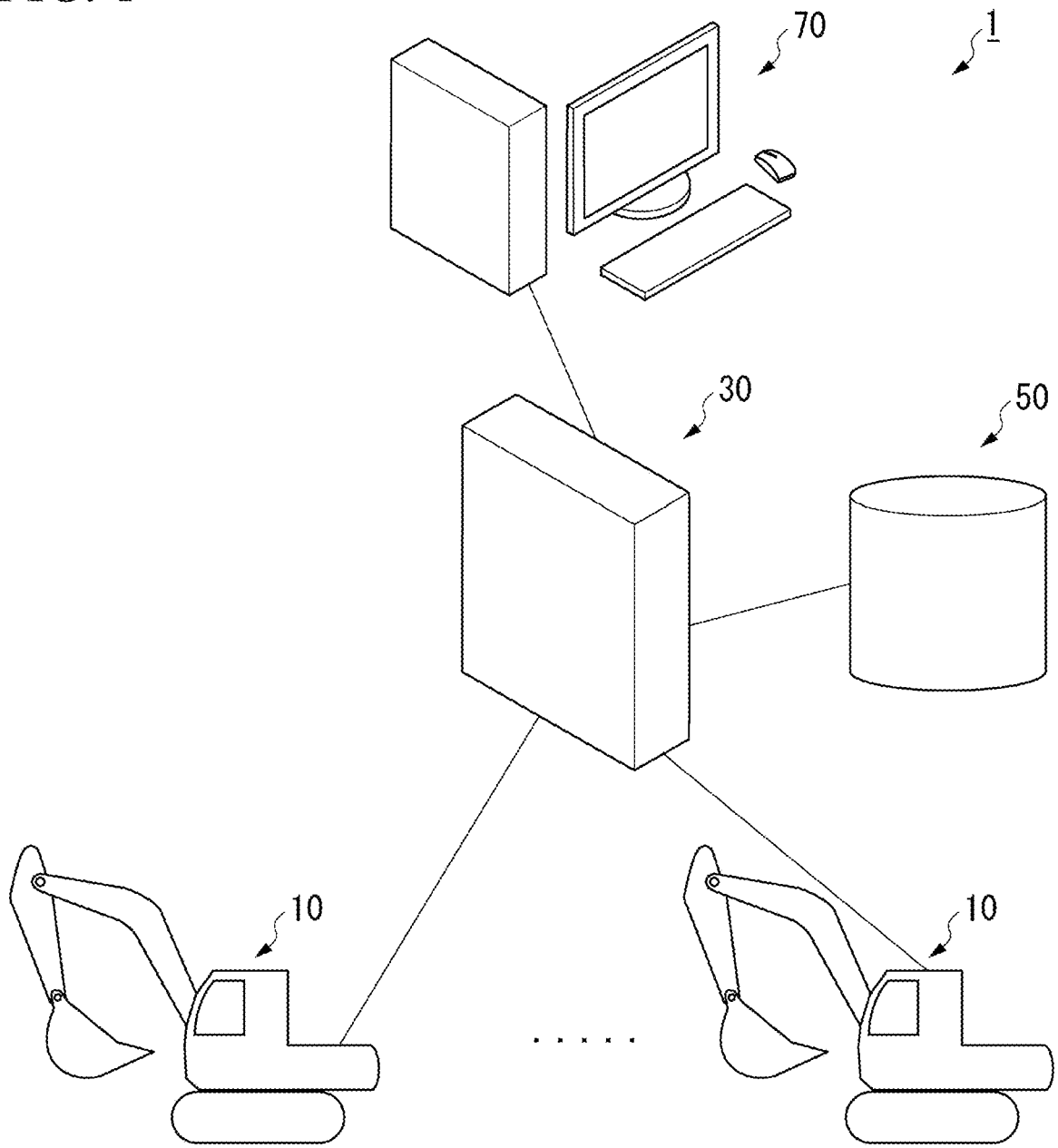

| PROCESSING DEFINITION FILE ||||
|---|---|---|---|
| PROCESSING FORMAT ||| TREND |
| DATA LIST | DATA 1 | DATA ITEM | ENGINE WATER TEMPERATURE |
| | | PROCESSING METHOD | MAXIMUM VALUE (MAX) |
| | DATA 2 | DATA ITEM | ENGINE WATER TEMPERATURE |
| | | PROCESSING METHOD | MINIMUM VALUE (MIN) |
| | DATA 3 | DATA ITEM | ENGINE SPEED |
| | | PROCESSING METHOD | AVERAGE VALUE (AVERAGE) |
| AGGREGATION PERIOD ||| 30min |
| FORMING PERIOD ||| 60min |

251

| PROCESSING DEFINITION FILE |||||
|---|---|---|---|---|
| PROCESSING FORMAT || HISTORY ||
| EVENT LIST | EVENT 1 | EVENT ID | OCCURRENCE OF FAILURE |
| | | CONDITIONAL EXPRESSION | ... |
| | EVENT 2 | EVENT ID | RECOVERY FROM FAILURE |
| | | CONDITIONAL EXPRESSION | ... |
| DATA LIST | DATA 1 | DATA ITEM | EVENT ID |
| | DATA 2 | DATA ITEM | FAILURE CODE |
| | DATA 3 | DATA ITEM | ENGINE WATER TEMPERATURE |
| AGGREGATION PERIOD ||| – |
| FORMING PERIOD ||| 60min |

FIG. 11

<DATA FILE OF HISTORY-TYPE DATA>

| EVENT TIME | EVENT ID | FAILURE CODE | ENGINE WATER TEMPERATURE |
|---|---|---|---|
| t0 | OCCURRENCE | FAILURE A | ... |
| t1 | RECOVERY | FAILURE A | ... |
| t2 | OCCURRENCE | FAILURE A | ... |
| t2 | OCCURRENCE | FAILURE B | ... |
| t3 | RECOVERY | FAILURE B | ... |

FORMING DATA (FILE) OF MEASUREMENT PERIOD

| PROCESSING DEFINITION FILE | | |
|---|---|---|
| PROCESSING FORMAT | MAP | |
| AXIS 1 | AXIS INFORMATION | x AXIS [0, 10, 20, ..., 70] |
| | DATA ITEM | ENGINE WATER TEMPERATURE |
| AXIS 2 | AXIS INFORMATION | y AXIS [0, 2, 4, ..., 12] |
| | DATA ITEM | AIR TEMPERATURE |
| AGGREGATION PERIOD | – | |
| FORMING PERIOD | 60min | |

| PROCESSING DEFINITION FILE |||| 
|---|---|---|---|
| PROCESSING FORMAT ||| SNAP |
| PRE-TRIGGER COUNT ||| **** |
| POST-TRIGGER COUNT ||| **** |
| EVENT LIST | EVENT 1 | EVENT ID | OCCURRENCE OF FAILURE |
| | | CONDITIONAL EXPRESSION | ... |
| DATA LIST | DATA 1 | DATA ITEM | VEHICLE SPEED DATA |
| | DATA 2 | DATA ITEM | ENGINE SPEED |
| | DATA 3 | DATA ITEM | ENGINE WATER TEMPERATURE |
| AGGREGATION PERIOD ||| - |
| FORMING PERIOD ||| - |

DATA TRANSMISSION SYSTEM, WORK MACHINE, AND DATA TRANSMISSION METHOD FOR WORK MACHINE

TECHNICAL FIELD

The present invention relates to a data transmission system, a work machine, and a data transmission method for the work machine. Priority is claimed on Japanese Patent Application No. 2020-182482, filed Oct. 30, 2020, the content of which is incorporated herein by reference.

BACKGROUND ART

Patent Literature 1 describes designating work machine information, which is data to be collected, based on definition information.

CITATION LIST

Patent Literature

[Patent Literature 1]
 Japanese Unexamined Patent Application, First Publication No. 2014-177816

SUMMARY OF INVENTION

Technical Problem

In general, for the convenience of the user, a work machine is configured to process raw data, which is various types of unprocessed data output from the main body of the work machine, into a form that is easy for the user to interpret and analyze, and then transmit the processed data. At this time, the data format of the raw data and the like are incorporated at the manufacturing stage of the work machine, based on the expected user's needs.

Since the usage patterns of work machine and the required data differ depending on a user, the data processing format incorporated at the manufacturing stage does not necessarily match what the user desires. In other words, after shipment, there is a need for the user to freely customize the data format of data output from the work machine.

The present disclosure has been made in view of the above circumstances, and an object of the present disclosure is to provide a data transmission device for a work machine that allows a user to freely customize a data format, the work machine, a data transmission method for the work machine, and a program.

Solution to Problem

According to one aspect of the present disclosure, a data transmission system for a work machine, includes: a processing definition receiving unit configured to receive processing definition information indicating contents of processing of data collected from the work machine; a processing unit configured to determine a data format to be processed, based on the received processing definition information, and process the data collected from the work machine based on the determined data format; and a transmission unit configured to transmit the processed data to an external device.

Advantageous Effects of Invention

According to a data transmission system for a work machine, the work machine, and a data transmission method for the work machine, the user can freely customize the data format of data of the work machine.

BRIEF DESCRIPTION OF DRAWINGS

FIG. 1 is a diagram showing the overall configuration of a data providing system according to a first embodiment.
FIG. 2 is a diagram showing a unified format.
FIG. 6 is a diagram showing a data structure of a processing definition file according to the first embodiment.
FIG. 11 is a diagram showing a data structure of a data file output by a processing unit according to the first embodiment.
FIG. 12 is a diagram showing the data structure of the processing definition file according to the first embodiment.
FIG. 15 is a diagram showing the data structure of the processing definition file according to the first embodiment.

DESCRIPTION OF EMBODIMENTS

First Embodiment

Figure 3:
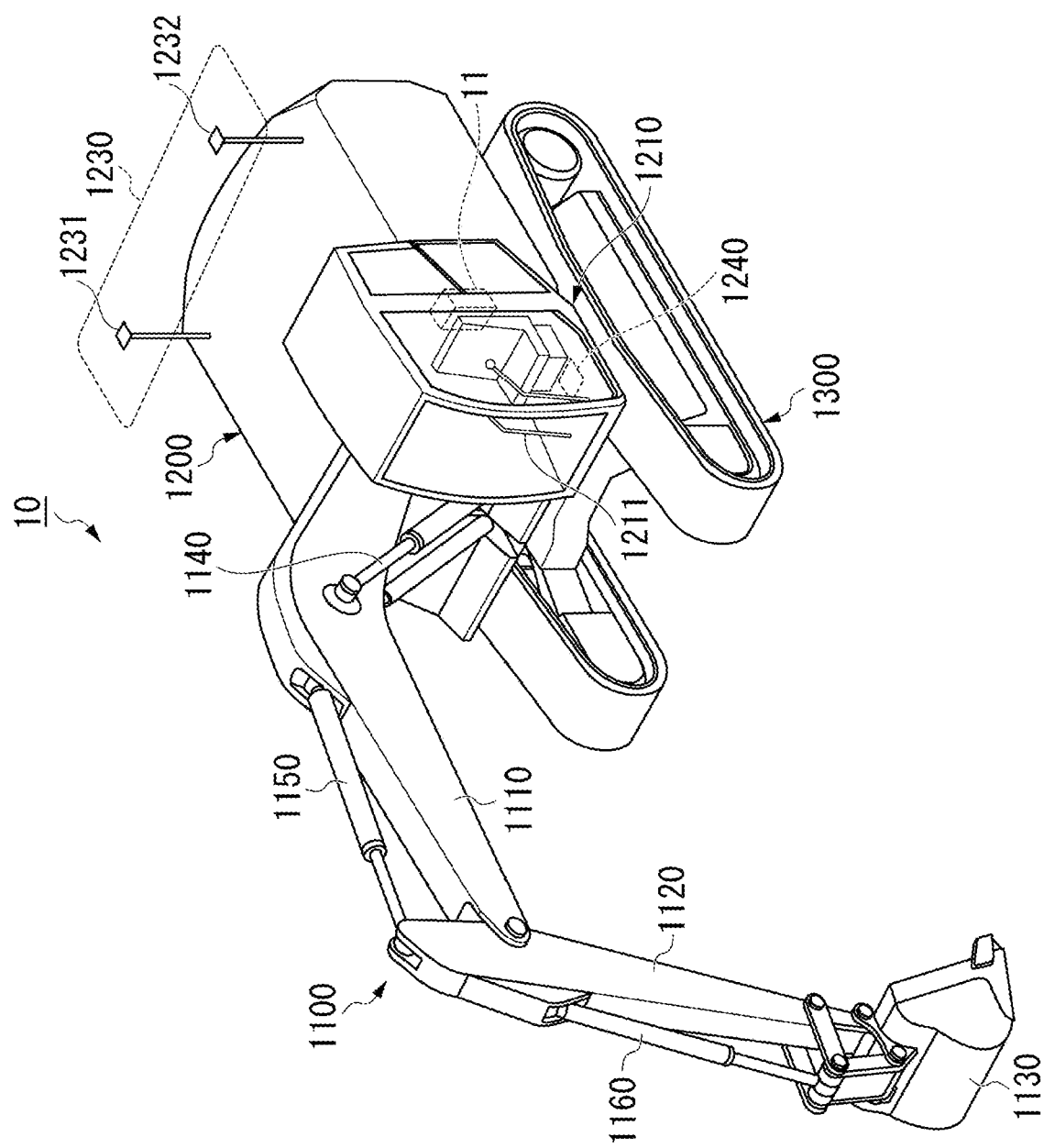
FIG. 3 is a perspective view showing the appearance of a work machine.

A data transmission device and a data providing system including the same according to a first embodiment will be described in detail below with reference to FIGS. 1 to 17
(Overall Configuration)
FIG. 1 is a diagram showing the overall configuration of a data providing system according to a first embodiment.

A data providing system 1 provides data related to a plurality of work machines for use by users. The data providing system 1 includes a plurality of work machines 10, a data server 30, a definition database 50, and a user device 70. Each work machine 10 collects data related to the work machine 10 and transmits the collected data to the data server 30. The data server 30 stores the data collected from the plurality of work machines 10, and provides the data to the user device 70. The definition database 50 stores information required when the data server 30 provides data. The user device 70 sets conditions for data to be collected by work machine 10, and acquires data related to the work machine 10 from the data server 30.

When communicating the data related to the work machine 10 between the work machine 10 and the data server 30 and between the data server 30 and the user device 70, communication is performed using unit data related to a unified format. The unified format is a unit data format in which one type of data value is stored. The work machine 10 stores a plurality of values included in the unit data of CAN collected from each component in each unit data of a unified format, and transmits the unit data to the data server 30. The data server 30 and the user device 70 are examples of external devices outside the vehicle. The unit data is also called a data frame, a packet, or a Protocol Data Unit (PDU).

Hereinafter, the unit data in the unified format will be called a unified data object.

FIG. 2 is a diagram showing the unified format.

The unified format stores an identifier indicating a type of data, a value of the data, and a timestamp indicating a time when a component acquires the data. Only one identifier, one value, and one timestamp are stored in one unified data object.

<<Configuration of Work Machine 10>>

FIG. 3 is a perspective view showing the appearance of the work machine 10.

The work machine 10 that is a work machine includes a work equipment 1100 that operates hydraulically, a swing body 1200 that supports the work equipment 1100, and a traveling body 1300 that supports the swing body 1200. Here, a portion of the swing body 1200 to which the work equipment 1100 is attached is called a front portion. In addition, with respect to the swing body 1200, on the basis of the front portion, the opposite portion is referred to as a rear portion, a portion on the left side is referred to as a left portion, and a portion on the right side is referred to as a right portion.

<<Work Equipment 1100>>

The work equipment 1100 includes a boom 1110, an arm 1120, a bucket 1130, a boom cylinder 1140, an arm cylinder 1150, and a bucket cylinder 1160.

The boom 1110 is a strut that supports the arm 1120 and the bucket 1130. The base end of the boom 1110 is attached to the front part of the swing body 1200 via a pin.

The arm 1120 connects the boom 1110 and the bucket 1130. The base end of the arm 1120 is attached to the tip of the boom 1110 via a pin.

The bucket 1130 is a container having a blade for excavating earth. The base end of the bucket 1130 is attached to the tip of the arm 1120 via a pin.

The boom cylinder 1140 is a hydraulic cylinder for operating the boom 1110. The base end of the boom cylinder 1140 is attached to the swing body 1200. The tip of the boom cylinder 1140 is attached to the boom 1110.

The arm cylinder 1150 is a hydraulic cylinder for driving the arm 1120. The base end of the arm cylinder 1150 is attached to the boom 1110. The tip of the arm cylinder 1150 is attached to the arm 1120.

The bucket cylinder 1160 is a hydraulic cylinder for driving the bucket 1130. The base end of the bucket cylinder 1160 is attached to the arm 1120. The tip of the bucket cylinder 1160 is attached to a link member connected to the bucket 1130.

<<Swing Body 1200>>

The swing body 1200 is provided with a cab 1210 in which an operator rides. The cab 1210 is provided in front of the swing body 1200 and on the left side of the work equipment 1100.

An operating device 1211 for operating the work equipment 1100 is provided inside the cab 1210. In accordance with the amount of operation of the operating device 1211, hydraulic oil is supplied to the boom cylinder 1140, the arm cylinder 1150, and the bucket cylinder 1160 to drive the work equipment 1100.

<<Component>>

The work machine 10 includes a position and azimuth direction calculator 1230 and a tilt detector 1240. The position and azimuth direction calculator 1230 and the tilt detector 1240 are examples of components. The work machine 10 also includes a data transmission device 11 that collects data related to the work machine 10 and transmits the data to the data server 30. The data transmission device 11 is provided in the cab 1210. Note that the data transmission device 11 may be provided outside the cab 1210 on the swing body 1200, for example. A control component 12 and an extension component 14 described below may similarly be provided inside the cab 1210 or may be provided outside the cab 1210.

The position and azimuth direction calculator 1230 calculates the position of the swing body 1200 and the azimuth direction to which the swing body 1200 faces. The position and azimuth direction calculator 1230 includes a first receiver 1231 and a second receiver 1232 that receive positioning signals from artificial satellites that configure a Global Navigation Satellite System (GNSS). The first receiver 1231 and the second receiver 1232 are installed at different positions on the swing body 1200, respectively. The position and azimuth direction calculator 1230 detects the position of the representative point O (origin of the vehicle body coordinate system) of the swing body 1200 in the field coordinate system, based on the positioning signal received by the first receiver 1231.

The position and azimuth direction calculator 1230 uses the positioning signal received by the first receiver 1231 and the positioning signal received by the second receiver 1232 to calculate the azimuth direction of the swing body 1200, as the relationship between the detected installation position of the first receiver 1231 and the installation position of the second receiver 1232.

The tilt detector 1240 measures the acceleration and angular velocity of the swing body 1200, and based on the measurement results, detects the tilt of the swing body 1200 (for example, roll representing rotation about the Xm axis, pitch representing rotation about the Ym axis, and yaw representing rotation about the Zm axis). The tilt detector 1240 is installed, for example, on the bottom surface of the cab 1210. The tilt detector 1240 can use, for example, an inertial measurement unit (IMU).

Figure 4:
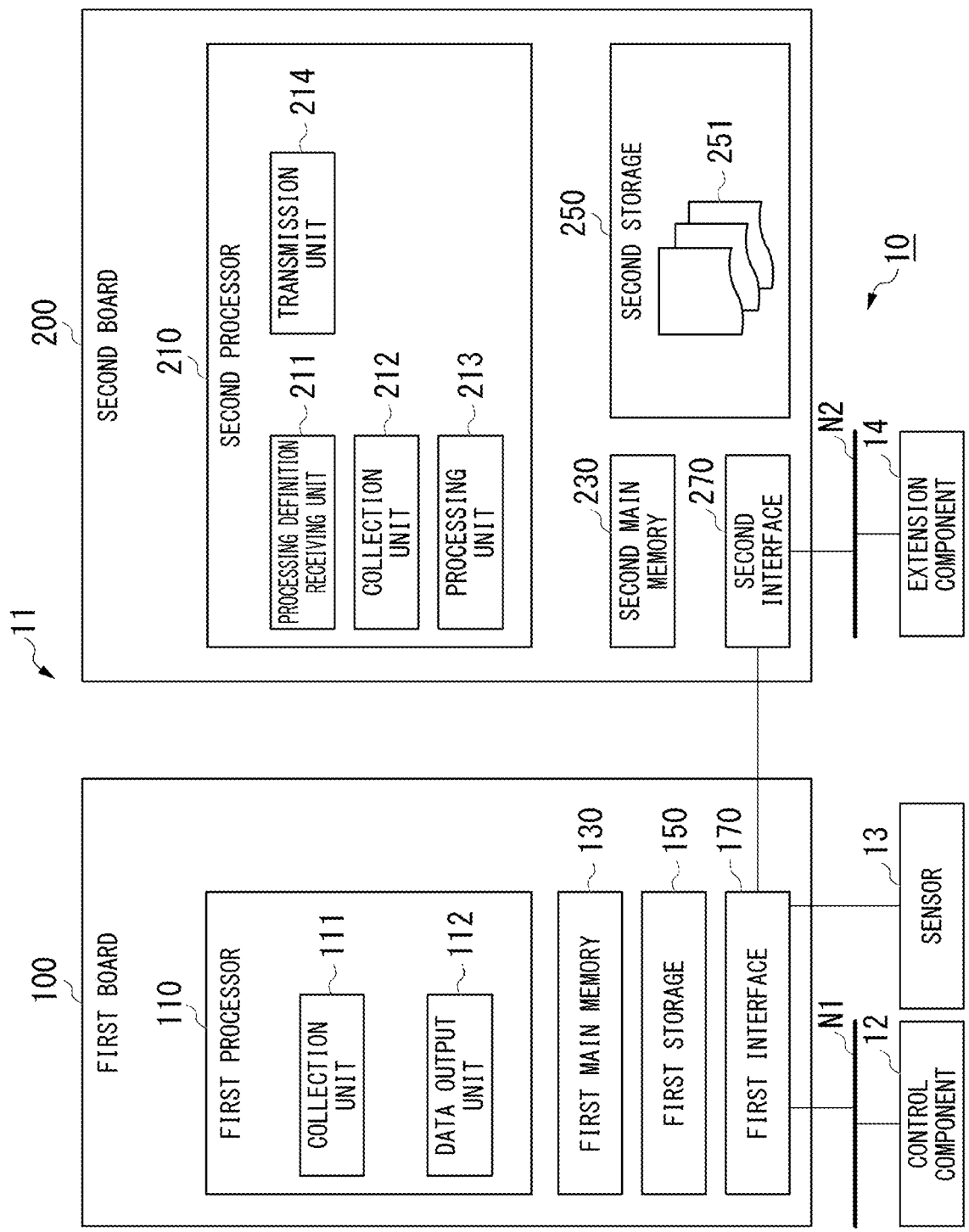
FIG. 4 is a block diagram showing the configuration of the work machine according to the first embodiment.

FIG. 4 is a block diagram showing the configuration of the work machine 10 according to the first embodiment.

The data transmission device 11 includes a first board 100 and a second board 200 which are physically separated. The first board 100 configures a computer that runs a real-time Operating System (OS). The second board 200 configures a computer that runs a general-purpose OS.

The first board 100 includes a first processor 110, a first main memory 130, a first storage 150, and a first interface 170. The first processor 110 reads a program from the first storage 150, develops it in the first main memory 130, and executes a predetermined process according to the program. The first interface 170 is connected with a plurality of control components 12 for controlling the work machine 10 via a first network N1. Examples of the control component 12 include an engine control component that acquires various types of engine-related data from sensors and performs engine-related control, a hydraulic control component that acquires various types of data related to the hydraulic equipment that controls the operation of the work equipment 1100 by using a sensor and controls the hydraulic equipment, a monitor control component that acquires data from various sensors of the work machine 10 and controls the display of a monitor (not shown), a communication component that controls communication equipment for communicating with an external server, or the like, and acquires data from various sensors of a work machine, or the like. The first network N1 is CAN, for example. The first interface 170 is also connected to a sensor 13 that detects the state quantity of the work machine 10. The control component 12 and the sensor 13 are examples of components mounted on the work machine 10. The basic operational control of the work machine 10 is performed by the control component 12 connected to the first network N1.

The second board 200 includes a second processor 210, a second main memory 230, a second storage 250, and a second interface 270. The second processor 210 reads a program from the second storage 250, develops it in the second main memory 230, and executes a predetermined process according to the program. The second interface 270 is connected to a plurality of extension components 14 for expanding the functions of the work machine 10 via the second network N2. Examples of the extension component 14 include an image display component that performs a predetermined image process on an image captured by a camera and controls the display, a machine guidance component that displays and controls a guidance monitor for providing guidance to the operator regarding the positional relationship between the design surface of the construction site and the work machine 10, a payload component for measuring the amount of soil excavated by the work equipment 1100, or the like. The second network N2 is CAN or Ethernet (registered trademark), for example. The extension component 14 is an example of a component mounted on the work machine 10. Extended information is provided to the work machine 10 and the operator by the extension component 14 connected to the second network N2.

Components that can be mounted on the work machine 10 are not limited to the control component 12, the sensor 13, and the extension component 14 described above. For example, the component may be a display controller that controls the display function of the work machine 10, a communication controller that controls the communication function of the work machine 10, or the like.

The first interface 170 and the second interface 270 are communicatively connected to each other.

The program stored in the first storage 150 or the second storage 250 may implement some of the functions to be exhibited on the first board 100 or the second board 200. For example, the program may exhibit the functions in combination with another program already stored in the first storage 150 or the second storage 250, or in combination with another program installed in another device. In other embodiments, the first board 100 or the second board 200 may include a custom Large Scale Integrated Circuit (LSI) such as a Programmable Logic Device (PLD) in addition to or instead of the above configuration. Examples of PLD include Programmable Array Logic (PAL), Generic Array Logic (GAL), Complex Programmable Logic Device (CPLD), and Field Programmable Gate Array (FPGA). In this case, part or all of the functions implemented by the first board 100 or the second board 200 may be implemented by the integrated circuit.

Examples of the first storage 150 and the second storage 250 include a hard disk drive (HDD), a solid state drive (SSD), a magnetic disk, a magneto-optical disk, a compact disc read only memory (CD-ROM), a digital versatile disc read only memory (DVD-ROM), and a semiconductor memory. The first storage 150 and the second storage 250 may be internal media directly connected to the bus line, or external media connected to the data transmission device 11 via the first interface 170 or a communication line. Further, this program may be transmitted to the data transmission device 11 via a communication line, and the first processor 110 or the second processor 210 may execute the program. In at least one embodiment, the first storage 150 and the second storage 250 are a non-transitory tangible storage medium.

The first processor 110 functions as a collection unit 111 and a data output unit 112 by executing programs stored in the first storage 150.

The collection unit 111 collects various types of data output from the control component 12 or the sensor 13.

The data output unit 112 outputs various types of data collected by the collection unit 111 to the second board 200.

The second processor 210 functions as a processing definition receiving unit 211, a collection unit 212, a processing unit 213, and a transmission unit 214 by executing programs stored in the second storage 250. Further, in the second storage 250, a storage area for a processing definition file 251, which is processing definition information, is secured.

The processing definition receiving unit 211 receives the processing definition file 251 from the user device 70 and records it in the second storage 250. The processing definition file 251 is information indicating details of processing of data collected from the work machine 10, and is information customized by the user. Specific contents of the processing definition file 251 will be described later.

The collection unit 212 collects various types of data output from the control component 12. The collection unit 212 also acquires various types of data collected by the collection unit 111, via the data output unit 112 of the first processor 110.

The processing unit 213 determines a data format to be processed based on the processing definition information received by the processing definition receiving unit 211, and processes data collected from the work machine 10 based on the determined data format.

The transmission unit 214 transmits to the data server 30, the processed data file, which is data processed by the processing unit 213. The user views the processed data file with a dedicated application or the like to interpret and analyze information about the work machine 10.

The data transmission device 11 may be a single computer, or a plurality of computers into which the configuration of the data transmission device 11 is divided and which cooperate with each other to function as a data distribution system for the work machine. The work machine 10 may include a plurality of computers that function as the data transmission device 11. Part of the computers configuring the data transmission device 11 may be installed inside the work machine 10 and the other computers may be installed outside the work machine 10.

Note that the single data transmission device 11 described above is also an example of a data transmission system. In another embodiment, part of the components configuring the data transmission system may be installed inside the work machine 10 and other components may be provided outside the work machine 10.

In another embodiment, the first board 100 and the second board 200 are not separated as hardware, but may be a single board.

(Processing Flow of Data Transmission Device)

Figure 5:
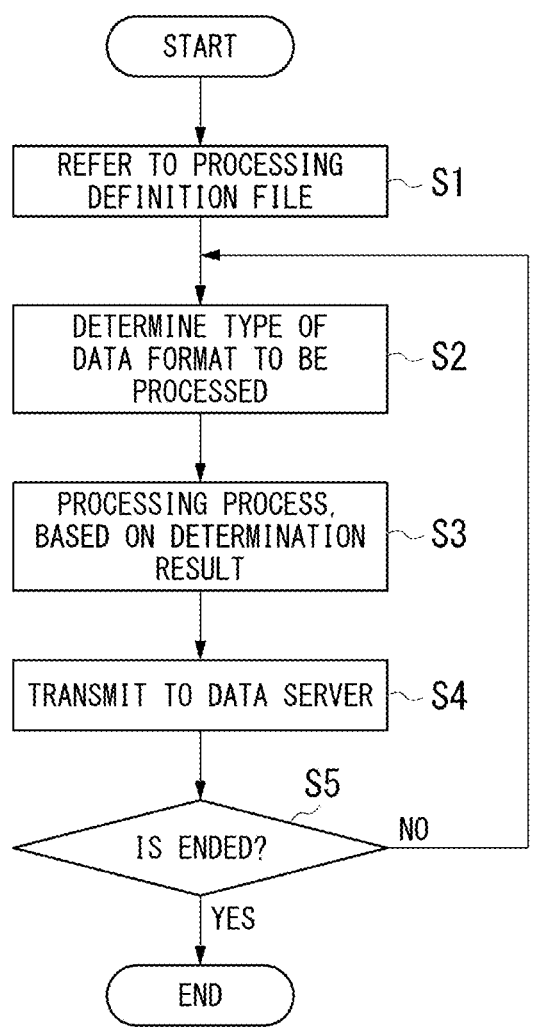
FIG. 5 is a diagram showing a processing flow of a data transmission device according to the first embodiment.

FIG. 5 is a diagram showing a processing flow of a data transmission device according to the first embodiment.

The processing flow shown in FIG. 5 is executed, for example, when the work machine 10 is initially started.

As shown in FIG. 5, the data transmission device 11 first refers to the processing definition file 251 (step S1). This processing definition file 251 is edited in advance by the user, transmitted from the user device 70, and stored in the second storage. One processing definition file 251 is prepared for each piece of data that the user wants to acquire.

The processing unit 213 refers to the processing definition file 251 to determine the type of data format to be processed (step S2). For example, the data format to be processed can be determined according to an identifier indicating the type of data format to be processed. The identifier indicating the type of data format to be processed is an example of information indicating the type of data format to be processed. The processing unit 213 performs a processing process, based on the determination result of step S2 (step S3). Here, apart from the processing flow shown in FIG. 5, the collection unit 111 of the first processor 110 and the collection unit 212 of the second processor 210 collect various types of data from time to time at a predetermined sampling cycle, from components, sensors, or the like connected to the first network N1 and the second network N2, respectively. The processing unit 213 refers to the various types of data collected in this way, and similarly performs a processing process on the data of the type designated in the processing definition file 251 from time to time at each cycle designated in the processing definition file 251.

The transmission unit 214 sequentially transmits the data processed by the processing unit 213 to the data server 30 (step S4).

The data transmission device 11 ends the process, when a predetermined end condition is satisfied (step S5; YES), such as when an operation to stop the work machine 10 is received.

On the other hand, while the end condition is not satisfied (step S5; NO), the processes of steps S2 to S4 are repeatedly executed. Note that some of steps S2 to S4 may be repeatedly executed.

Note that the flowchart shown in FIG. 5 is an example, and all steps may not need to be executed in other embodiments. For example, in another embodiment, when the data format to be processed is fixed, the process of step S2 may not be executed.

Description of Processing Process

FIGS. 6 to 17 are explanatory diagrams of a processing process of the data transmission device according to the first embodiment.

Trend-Type Data

First, a processing process of trend-type data will be described in detail with reference to FIGS. 6 to 9. The trend-type data is information that enables evaluation and analysis of the tendency of a certain record item to change over time.

FIG. 6 shows an example of the data structure of the processing definition file 251 used to create trend-type data.

As shown in FIG. 6, the processing definition file 251 records an identifier "trend" indicating that the data format is trend-type data.

A data list is provided in the processing definition file 251 of this trend-type data. This data list designates data items to be recorded. In the example shown in FIG. 6, three types of data (data 1, data 2, and data 3) are listed in the data list. Any number of pieces of data can be designated in the data list.

A data item and a processing method are designated in each of data 1 to data 3 listed in the data list. Here, examples of the data items include an engine water temperature, an engine speed, an air temperature, service meter reading (SMR), work machine position (latitude, longitude), or the like, and are information indicating the types of various types of data acquired by the work machine. A processing method is information indicating a statistical processing method of data, such as an average value, a maximum value, or a minimum value.

The aggregation period is information that designates a cycle in which the above-described processing method is applied to the collected data. For each aggregation period, one piece of aggregation data processed by the above processing method is added to the sampling data collected during that period.

The forming period is information that designates the cycle of forming the data file. One data file is formed with the aggregation data aggregated during this forming period.

Figure 7:
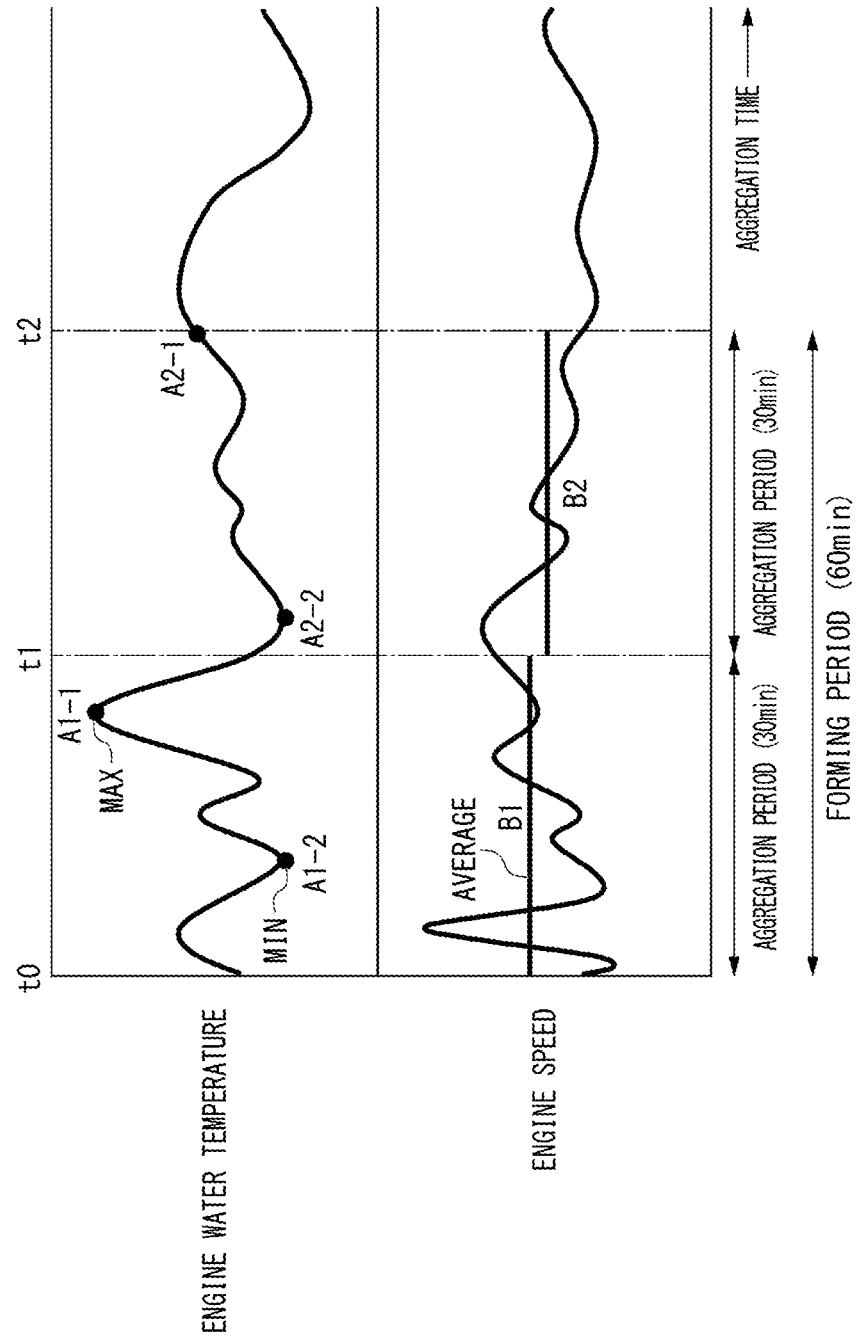
FIG. 7 is a diagram showing a trend-type data creation process according to the first embodiment.

FIG. 7 is a diagram illustrating a trend-type data creation process performed by the processing unit 213 on sampling data (pre-processing data) collected by the collection unit 111 and the collection unit 212. The processing process performed by the processing unit 213 based on the processing definition file 251 shown in FIG. 6 will be described with reference to FIG. 7.

When the processing unit 213 performs a processing process based on the processing definition file 251 of FIG. 6, the processing unit 213 acquires maximum and minimum values of the engine water temperature and the average value of the engine speed, every 30 minutes during the aggregation period. Specifically, when the time reaches the time t1 after 30 minutes from the time t0, the processing unit 213 extracts a minimum value A1-2 and a maximum value A1-1 of the sampling data of the engine water temperature collected from the time t0 to the time t1, and calculates an average value B1 of the sampling data of the engine speed collected from the time t0 to the time t1.

Thereafter, when the time reaches the time t2 after 30 minutes from the time t1, the processing unit 213 extracts a minimum value A2-2 and a maximum value A2-1 of the sampling data of the engine water temperature collected from the time t1 to the time t2, and calculates an average value B2 of the sampling data of the engine speed collected from the time t1 to the time t2.

Further, when the time reaches the time t2 after 60 minutes from the time t0, the processing unit 213 combines the aggregation data (processed data) aggregated from the time t0 to the time t2 to form one data file.

Figure 8:
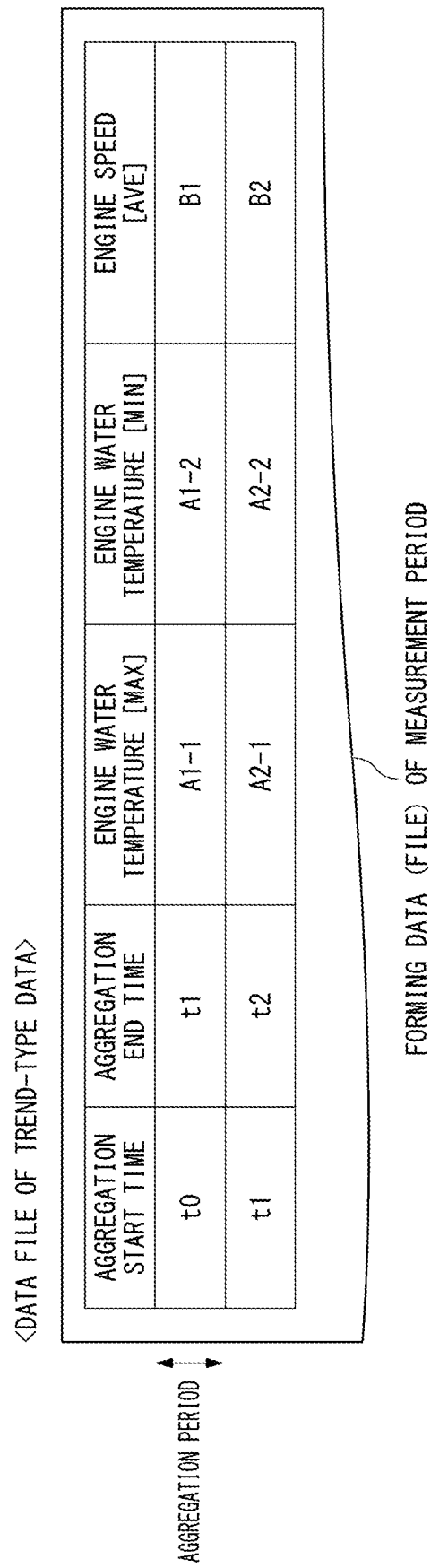
FIG. 8 is a diagram showing a data structure of a data file output by a processing unit according to the first embodiment.

FIG. 8 is a diagram showing the data structure of the data file output by the processing unit 213 as a result of the processing process shown in FIG. 7.

As shown in FIG. 8, in the data file of the trend-type data, the maximum values (A1-1, A2-1) of the engine water temperature, the minimum values (A1-2, A2-2) of the engine water temperature, and the average values (B1, B2) of the engine speed during each aggregation period (time t0 to t1, time t1 to t2) are recorded, and are collected to form a file.

(History-Type Data)

Next, the processing process of history-type data will be described in detail with reference to FIGS. 9 to 11. The history-type data is information that enables analysis of the occurrence frequency and occurrence time of a certain event.

Figures 9, 10:
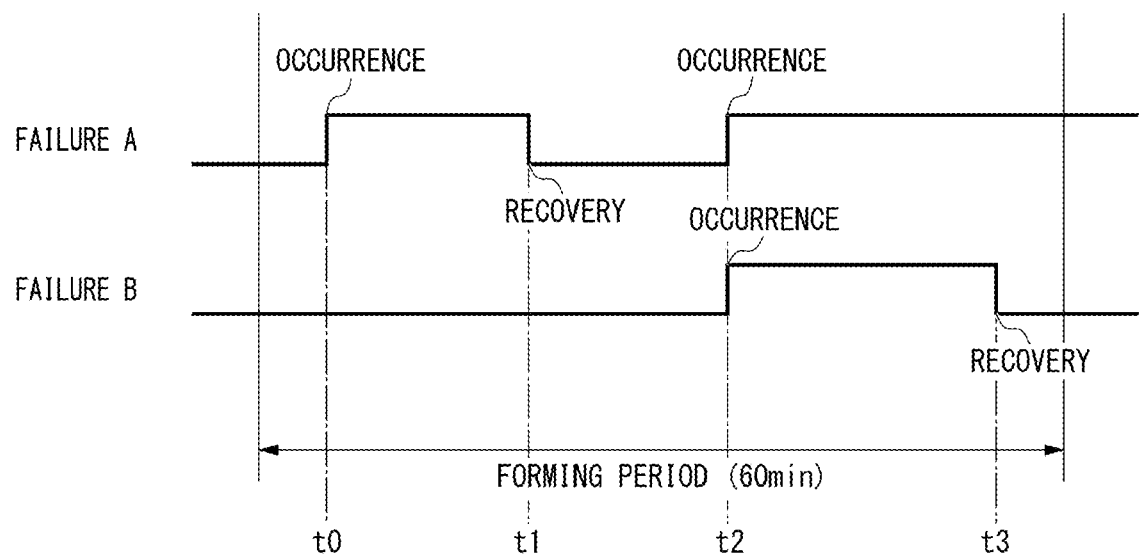
FIG. 9 is a diagram showing the data structure of the processing definition file according to the first embodiment.
FIG. 10 is a diagram showing a time series of occurrence/recovery of failure A and failure B in sampling data according to the first embodiment.

FIG. 9 shows an example of the data structure of the processing definition file 251 used to create history-type data.

As shown in FIG. 9, the processing definition file 251 records an identifier "history" indicating that the data format is history-type data.

An event list and a data list are provided in the processing definition file 251 of this history-type data. This event list designates event IDs to be recorded and conditional expressions as specific contents thereof. The event ID is a value that identifies various events such as occurrence of failure, recovery from failure, occurrence of CAN abnormality, or the like. The specific contents of the event indicated by each event ID can be arbitrarily designated according to a conditional expression defined corresponding to each event ID. By editing this conditional expression as desired, for example, it is possible to define as an event that the engine water temperature exceeds 100° C., and it is also possible to define AND conditions, OR conditions, or the like of a plurality of events as new events.

In the example shown in FIG. 9, although two types of events (event 1=occurrence of failure, event 2=recovery from failure) are listed in the event list, without being limited to this, any number of events can be designated in the event list.

In the example shown in FIG. 9, three types of data (data 1=event ID, data 2=failure code, and data 3=engine water temperature) are listed in the data list. For the data listed in the data list, values at the timing when each event listed in the event list occurs are recorded.

In the processing definition file 251 for history-type data, the column for the aggregation period is not used.

FIG. 10 is a diagram illustrating the time series of the occurrence and recovery of each of failures A and B, obtained from the sampling data (pre-processing data) collected by the collection units 111 and 212. The processing process performed by the processing unit 213 based on the processing definition file 251 shown in FIG. 9 will be described with reference to FIG. 10.

When the processing unit 213 performs a processing process, based on the processing definition file 251 of FIG. 9, each time an event ID (occurrence of failure, recovery from failure) designated in the event list occurs, the processing unit 213 records the time of occurrence and the values of various types of data (an event ID, a failure code, an engine water temperature) at the time of occurrence.

For example, as shown in FIG. 10, it is assumed that failures A and B occur and recover from the failures at times t0, t1, t2, and t3, respectively. In this case, the processing unit 213 records the times t0, t1, t2, and t3 at which each event occurs, and also records the event ID, failure code, and engine water temperature at the times.

The processing unit 213 combines the time histories of events occurring within the forming period and various types of data and forms one file. The forming period is, for example, 60 minutes.

FIG. 11 is a diagram showing the data structure of the data file output by the processing unit 213 as a result of the processing process shown in FIG. 10.

As shown in FIG. 11, in the data file of the history-type data, an event time which is the time of occurrence of an event ID (occurrence of failure, recovery from failure) that occurred within the forming period of 60 minutes, and various types of data at each time (event ID, failure code, engine water temperature) are recorded.

In the example of the process shown in FIGS. 9 to 11, it has been described that the processing unit 213 records the dates and times of occurrence of the two events of failure occurrence and recovery from failure in time series, but information that can be recorded in history-type data is not limited to this. For example, the processing unit 213 can count and record the number of occurrences of a predetermined event (occurrence of a failure). Further, when a predetermined event occurs, it is also possible to immediately form a data file at that timing and transmit it to the data server 30.

(Map-Type Data)

Next, the processing process of map-type data will be described in detail with reference to FIGS. 12 to 14. The map-type data is information that expresses the occurrence frequency of each value in a combination of one or two record items in a one-dimensional distribution or a two-dimensional distribution.

FIG. 12 shows an example of the data structure of the processing definition file 251 used to create map-type data.

As shown in FIG. 12, the processing definition file 251 records an identifier "map" indicating that the data format is map-type data.

The processing definition file 251 for map-type data is not provided with columns for designating axis 1 and axis 2. The columns for axis 1 and axis 2 define the types of axes (X axis, Y axis) in the map-type data and the numerical ranges for each class on the axes. When it is desired to create a one-axis map (histogram), designation may be performed for one axis.

In the processing definition file 251 for map-type data, the column for the aggregation period is not used.

Figure 13:
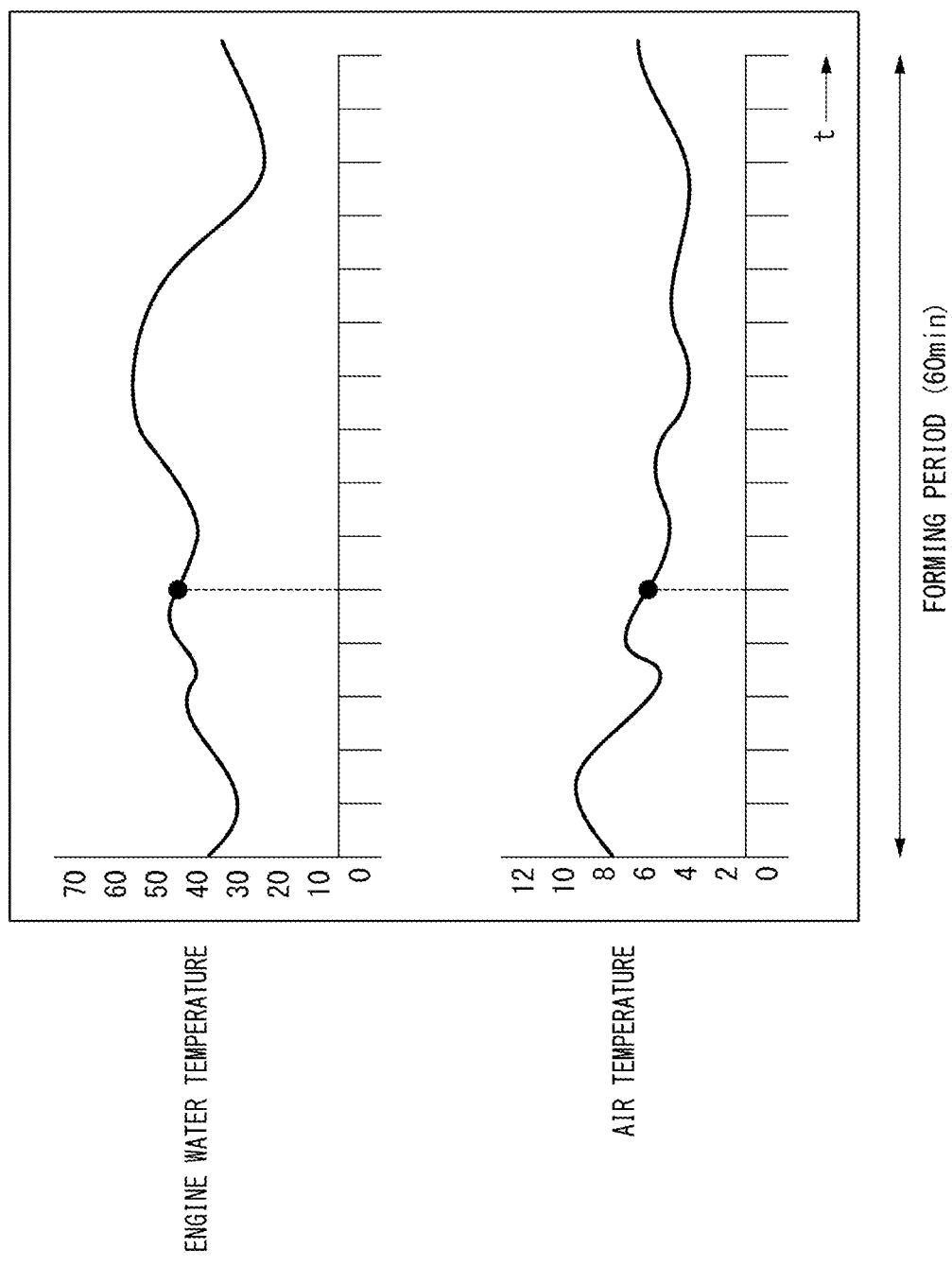
FIG. 13 is a diagram showing time series of engine water temperature and air temperature in the time series of sampling data according to the first embodiment.

FIG. 13 is a diagram illustrating the time series of each of the engine water temperature and the air temperature, obtained from the sampling data (pre-processing data) collected by the collection units 111 and 212. The processing process performed by the processing unit 213 based on the processing definition file 251 shown in FIG. 12 will be described with reference to FIG. 13.

When the processing unit 213 performs a processing process based on the processing definition file 251 of FIG. 12, the processing unit 213 refers to sampling data of various types of data (engine water temperature, air temperature) designated for each of the axis 1 and the axis 2, and creates a two-dimensional counter map with each data as an axis.

Specifically, as shown in FIG. 13, the processing unit 213 acquires sampling data of the engine water temperature and the air temperature collected during the forming period (60 minutes). Then, based on the axis information on the axis 1 shown in FIG. 12, the processing unit 213 calculates the number of pieces of sampling data of the engine water temperature belonging to each class of [0, 10, 20, . . . , 70], and plots the calculation result as the x-axis.

Similarly, based on the axis information on the axis 2 shown in FIG. 12, the processing unit 213 calculates the number of pieces of sampling data of the air temperature belonging to each class of [0, 2, 4, . . . , 12], and plots this as the y-axis.

Figure 14:
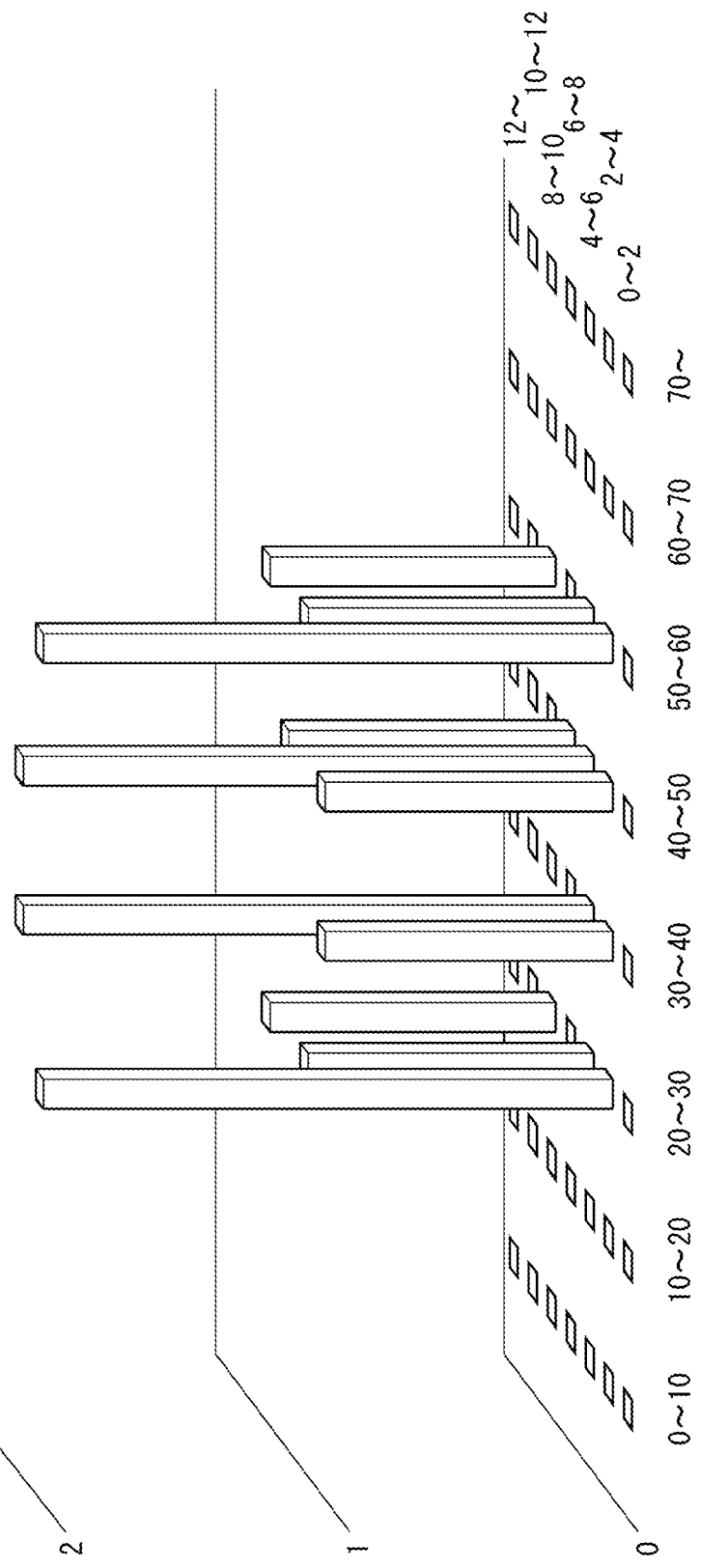
FIG. 14 is a diagram showing a two-dimensional counter map according to the first embodiment.

In this way, the processing unit 213 creates a two-dimensional counter map consisting of the x-axis and the y-axis, as shown in FIG. 14.

(Snap-Type Data)

Next, a processing process of snap-type data will be described in detail with reference to FIGS. 15 to 17. The snap-type data is information obtained by extracting, with the occurrence of a certain event as a trigger, time-series data before and after the occurrence time of the event.

FIG. 15 shows an example of the data structure of the processing definition file 251 used to create snap-type data.

As shown in FIG. 15, the processing definition file 251 records an identifier "snap" indicating that the data format is snap-type data.

An event list and a data list are provided in the processing definition file 251 of this snap-type data.

In the event list, the event ID of the event which is a trigger, and its conditional expression are designated. In the example shown in FIG. 15, occurrences of failures are listed in the event list.

Further, in the data list, the data items to be recorded are designated. In the example shown in FIG. 15, three types of data (data 1=vehicle speed data, data 2=engine speed, and data 3=engine water temperature) are listed in the data list.

Further, as shown in FIG. 15, the processing definition file 251 is provided with columns for designating a pre-trigger count and the post-trigger count.

As the pre-trigger count, with the time when the event designated in the event list occurs as a reference, the number of recorded data pieces before the occurrence of the event is designated.

As the post-trigger count, with the time when the event designated in the event list occurs as a reference, the number of recorded data pieces after the occurrence of the event is designated.

In the processing definition file 251 for snap-type data, the columns for the aggregation period and the forming period are not used.

Figure 16:
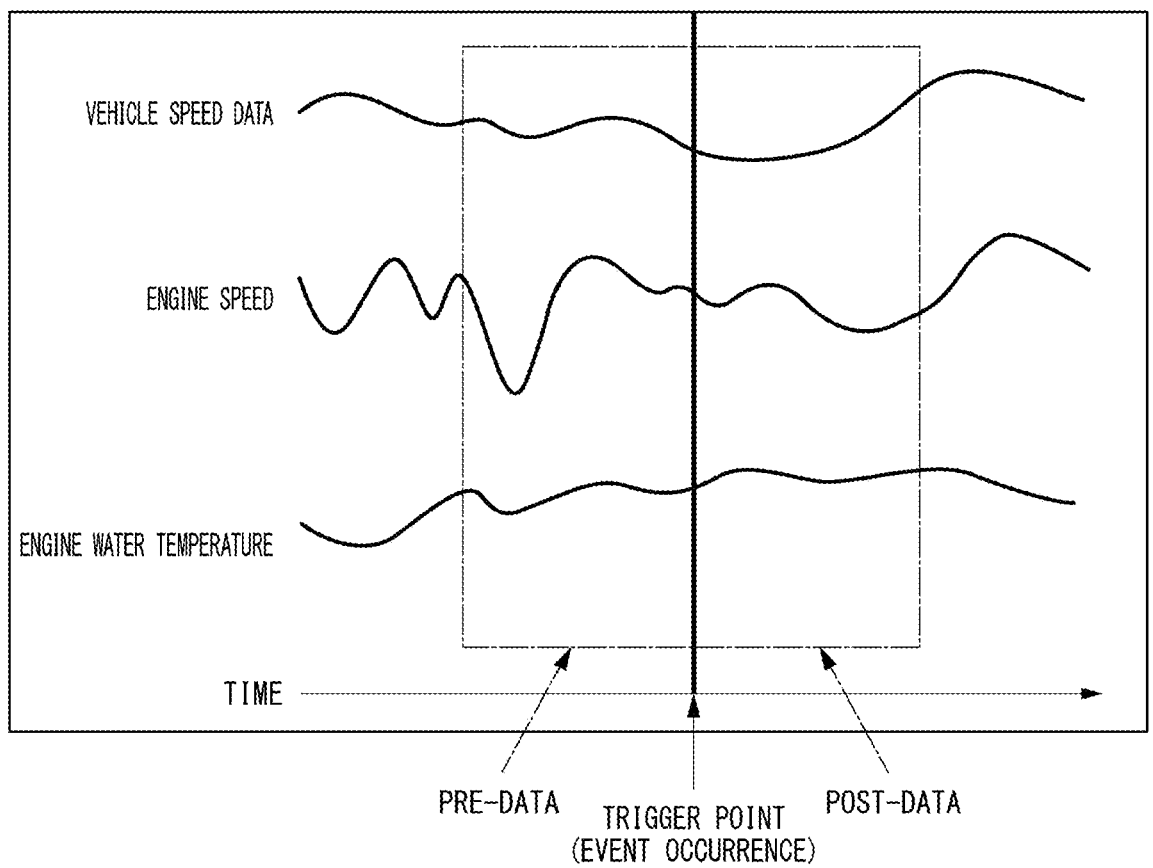
FIG. 16 is a diagram showing time series of vehicle speed data, an engine speed, and an engine water temperature in the time series of sampling data according to the first embodiment.

FIG. 16 is a diagram illustrating the time series of each of the vehicle speed data, the engine speed, and the engine water temperature, obtained from the sampling data (pre-processing data) collected by the collection units 111 and 212. The processing process performed by the processing unit 213 based on the processing definition file 251 shown in FIG. 15 will be described with reference to FIG. 16.

When the processing unit 213 performs a processing process based on the processing definition file 251 of FIG. 15, the processing unit 213 always monitors the occurrence of the event designated in the event list. When the occurrence of the event is detected, the processing unit 213 acquires, as the pre-trigger data, the sampling data of the number of pieces of data designated by the pre-trigger count, at a time before the occurrence time. Further, the processing unit 213 acquires, as post-trigger data, the sampling data of the number of pieces of data designated by the post-trigger count, at a time after the occurrence time.

The processing unit 213 combines the pre-trigger data and the post-trigger data to form one data file.

Figure 17:
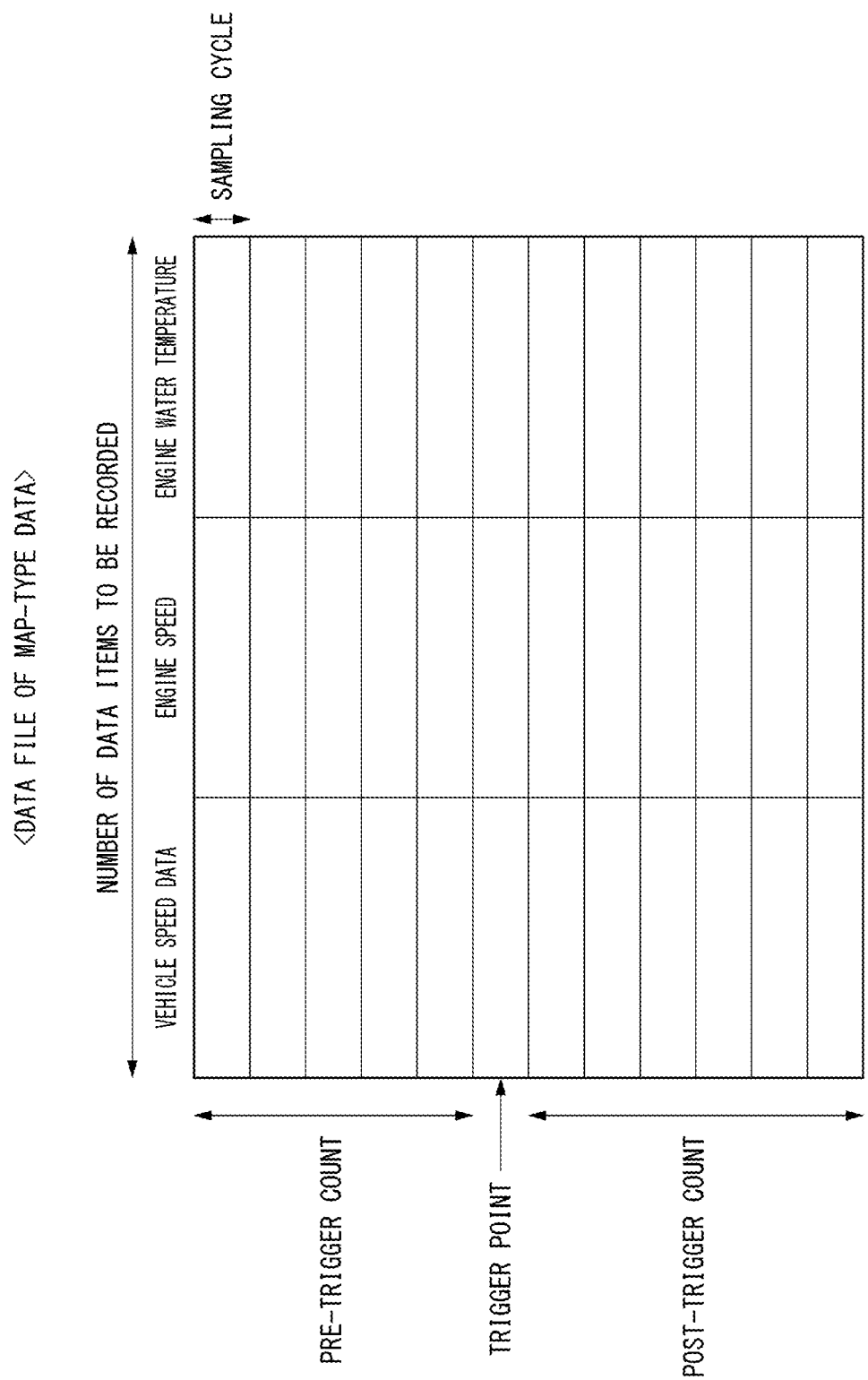
FIG. 17 is a diagram showing a data structure of a data file output by a processing unit according to the first embodiment.

FIG. 17 is a diagram showing the data structure of the data file output by the processing unit 213 as a result of the processing process shown in FIG. 16.

As shown in FIG. 17, in the data file of the snap-type data, the sampling data for the pre-trigger count and the sampling data for the post-trigger count, with the trigger point as a reference.

(Action, Effect)

As described above, the data transmission device 11 according to the first embodiment includes a processing definition receiving unit 211 that receives from the outside, the processing definition file 251, which is processing definition information indicating the contents of the processing process on the data acquired from the work machine 10, a processing unit 213 that processes data acquired from the work machine based on the received processing definition file, and a transmission unit 214 that transmits processed data, which is data processed, to the data server 30.

According to such a configuration, the user can obtain raw data (pre-processing data) obtained from the work machine in a state processed by a desired processing method, by editing the processing definition file.

The data transmission device 11 according to the present embodiment may be provided with a file in which only definitions of conditional expressions of events are aggregated, separately from the processing definition file. By doing so, by editing the conditional expressions as desired in the separate file, it is possible to define a condition key that can be commonly handled in the processing definition file 251. Therefore, the convenience of editing the processing definition file 251 can be improved.

The procedures of various processes of the data collection device described above are stored in a computer-readable recording medium in the form of programs, and the various processes are performed by reading and executing the programs by a computer. The computer-readable recording media include magnetic disks, magneto-optical disks, CD-ROMs, DVD-ROMs, semiconductor memories, and the like. Alternatively, the computer program may be transmitted to a computer via a communication line, and the computer receiving the transmission may execute the program.

The above program may be for implementing a part of the above-described functions. Further, the program may be a so-called differential file or a differential program which achieves the above-described function in combination with programs already recorded in the computer system.

Although several embodiments of the present disclosure have been described above, these embodiments are presented by way of example and are not intended to limit the scope of the disclosure. These embodiments can be implemented in various other forms, and various omissions, replacements, and modifications can be made without departing from the gist of the disclosure.

Further, although the work machine 10 according to the above-described embodiment is a hydraulic excavator, it is not limited to this. For example, the work machine 10 according to other embodiments may be other work machines such as a dump truck, a bulldozer, and a wheel loader.

INDUSTRIAL APPLICABILITY

According to each aspect of the present invention, the user can freely customize the data format.

REFERENCE SIGNS LIST

1: Data providing system
10: Work machine
11: Data transmission device
100: First board
200: Second board
110: First processor
130: First main memory
150: First storage
170: First interface
210: Second processor
230: Second main memory
250: Second storage
270: Second interface
12: Control component
13: Sensor
14: Extension component N1: First network
N2: Second network
111: Collection unit
112: Data output unit
211: Processing definition receiving unit
212: Collection unit
213: Processing unit
214: Transmission unit
251: Processing definition file

The invention claimed is:

1. A data transmission system for a work machine comprising:
    a processor, the processor being configured to:
    receive processing definition information indicating details of processing of data collected from the work machine;
    determine a data format to be processed, based on the received processing definition information, and process the data collected from the work machine based on the determined data format; and
    transmit the processed data to an external device, wherein the processing definition information includes at least information indicating a type of the data format to be processed,
    wherein the processor processes the data in accordance with the information indicating the type of the data format designated in the processing definition information,
    wherein the processor further creates trend-type data recorded for each aggregation period designated in the processing definition information, in accordance with the information indicating the type of the data format,
    wherein the processing definition information further includes data items indicating types of data to be processed, and a processing method indicating at least one of an average value, a maximum value, or a minimum value corresponding to the data items, and
    wherein the processor processes each of the data collected in the aggregation period according to the processing method which is indicated, for each of the types of data designated in the data items.

2. The data transmission system for a work machine according to claim 1, wherein the processor creates history-type data in which occurrences of events designated in the processing definition information are recorded in time series, in accordance with the information indicating the type of the data format.

3. The data transmission system for a work machine according to claim 2, wherein
    the processor creates map-type data that is a counter map or a histogram with one or a plurality of the data as an axis, in accordance with the information indicating the type of the data format.

4. The data transmission system for a work machine according to claim 2, wherein
    the processor creates snap-type data in which, with an occurrence of an event designated in the processing definition information as a trigger, time series of the data before and after the occurrence of the event is recorded, in accordance with the information indicating the type of the data format.

5. A work machine comprising:
    transmission system for a work machine according to claim 2.

6. The data transmission system for a work machine according to claim 1, wherein the processor creates map-type data that is a counter map or a histogram with one or a plurality of the data as an axis, in accordance with the information indicating the type of the data format.

7. The data transmission system for a work machine according to claim 6, wherein
    the processor creates snap-type data in which, with an occurrence of an event designated in the processing definition information as a trigger, time series of the data before and after the occurrence of the event is recorded, in accordance with the information indicating the type of the data format.

8. A work machine comprising:
    transmission system for a work machine according to claim 6.

9. The data transmission system for a work machine according to claim 1, wherein the processor creates snap-type data in which, with an occurrence of an event designated in the processing definition information as a trigger, time series of the data before and after the occurrence of the event is recorded, in accordance with the information indicating the type of the data format.

10. A work machine comprising:
    transmission system for a work machine according to claim 9.

11. A work machine comprising:
    transmission system for a work machine according to claim 1.

12. A data transmission method for a work machine comprising:
    a step of receiving processing definition information indicating details of processing of data collected from the work machine;
    a step of determining a data format to be processed, based on the received processing definition information, and processing the data collected from the work machine based on the determined data format; and
    a step of transmitting the processed data to an external device,
    wherein the processing definition information includes at least information indicating a type of the data format to be processed,
    wherein the processor processes the data in accordance with the information indicating the type of the data format designated in the processing definition information,
    wherein the processor further creates trend-type data recorded for each aggregation period designated in the processing definition information, in accordance with the information indicating the type of the data format,
    wherein the processing definition information further includes data items indicating types of data to be processed, and a processing method indicating at least one of an average value, a maximum value, or a minimum value corresponding to the data items, and
    wherein the processor processes each of data collected in the aggregation period according to the processing method which is indicated, for each of the types of data designated in the data items.

* * * * *